(12) United States Patent
Levy et al.

(10) Patent No.: US 9,754,161 B2
(45) Date of Patent: Sep. 5, 2017

(54) SYSTEM AND METHOD FOR COMPUTER VISION BASED TRACKING OF AN OBJECT

(71) Applicant: POINTGRAB LTD., Hod Hasharon (IL)

(72) Inventors: Gilboa Levy, Tel Aviv (IL); Haim Perski, Hod Hasharon (IL)

(73) Assignee: POINTGRAB LTD., Hod Hasharon (IL)

( * ) Notice: Subject to any disclaimer, the term of this patent is extended or adjusted under 35 U.S.C. 154(b) by 0 days.

(21) Appl. No.: 15/340,068

(22) Filed: Nov. 1, 2016

(65) Prior Publication Data

US 2017/0091542 A1    Mar. 30, 2017

Related U.S. Application Data

(63) Continuation-in-part of application No. 14/976,615, filed on Dec. 28, 2015, now Pat. No. 9,483,691, which is a continuation of application No. 14/599,670, filed on Jan. 19, 2015, now Pat. No. 9,256,781, which is a continuation-in-part of application No. 13/926,445, filed on Jun. 25, 2013, now Pat. No. 8,938,124, which is a continuation of application No. PCT/IL2013/050396, filed on May 9, 2013.

(60) Provisional application No. 61/645,212, filed on May 10, 2012.

(51) Int. Cl.
*G06K 9/00* (2006.01)
*G06T 7/20* (2017.01)
*G06F 3/01* (2006.01)

(52) U.S. Cl.
CPC ......... *G06K 9/00369* (2013.01); *G06F 3/017* (2013.01); *G06K 9/00335* (2013.01); *G06K 9/00355* (2013.01); *G06T 7/20* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 2007/0127819 A1* | 6/2007 | Lee | G06F 17/3079 382/190 |
| 2008/0118106 A1* | 5/2008 | Kilambi | G06M 11/00 382/103 |
| 2012/0148103 A1* | 6/2012 | Hampel | G06K 9/00771 382/103 |

(Continued)

FOREIGN PATENT DOCUMENTS

WO   WO 2012012555 A1 *  1/2012  ......... G06K 9/00778

OTHER PUBLICATIONS

Energy efficient building environment control strategies using real-time occupancy measurements. Erickson et al., 2009.*

*Primary Examiner* — Delomia L Gilliard
(74) *Attorney, Agent, or Firm* — Daniel J. Swirsky; AlphaPatent Associates Ltd.

(57) ABSTRACT

Determining occupancy in a space by detecting a suspected object in a first image of a space, creating a bounding shape around the suspected object in the image, the bounding shape being aligned towards the center of the image, tracking a selected feature from within the bonding shape, determining occupancy in the space based on the tracking, and controlling a device based on the occupancy determination.

8 Claims, 9 Drawing Sheets

(56) References Cited

U.S. PATENT DOCUMENTS

2014/0193034 A1\* 7/2014 Oami ................. G06K 9/00362
382/103
2017/0003047 A1\* 1/2017 Grohman ............... G05B 15/02

\* cited by examiner

SYSTEM AND METHOD FOR COMPUTER VISION BASED TRACKING OF AN OBJECT

CROSS-REFERENCE TO RELATED APPLICATIONS

This application is a continuation-in-part application of U.S. patent application Ser. No. 14/979,615, filed Dec. 28, 2015, which is a continuation application of U.S. patent application Ser. No. 14/599,670, filed Jan. 19, 2015, now U.S. Pat. No. 9,256,781, issued on Feb. 9, 2016, which is a continuation in-part application of U.S. patent application Ser. No. 13/926,445, filed Jun. 6, 2013, now U.S. Pat. No. 8,938,124, issued on Jan. 20, 2015, which is a continuation application of PCT International Application No. PCT/IL2013/050396, filed on May 9, 2013, which claims the benefit of U.S. Provisional Application No. 61/645,212, filed May 10, 2012, all incorporated herein by reference.

FIELD

The present invention relates to the field of computer vision based tracking of objects and control of electronic devices based on the tracked objects.

BACKGROUND

The need for more convenient, intuitive and portable input devices increases, as computers and other electronic devices become more prevalent in our everyday life.

Recently, human gesturing, such as hand gesturing, has been suggested as a user interface input tool in which a hand gesture is detected by a camera and is translated into a specific command. Gesture recognition enables humans to interface with machines naturally without any mechanical appliances. The development of alternative computer interfaces (forgoing the traditional keyboard and mouse), video games and remote controlling are only some of the fields that may implement human gesturing techniques.

Recognition of a hand gesture usually requires identification of an object as a hand and tracking the identified hand to detect a posture or gesture that is being performed.

Known gesture recognizing systems identify a user hand by using color, shape and/or contour detectors. The hand is then tracked by following features, such as pixels, determined to represent the hand, throughout a plurality of images.

However, tracking a hand or other object in a "noisy" environment (e.g., a moving background or a background having designs similar to a human hand) may prove to be a challenge for known methods of tracking. A system for controlling a device based on tracking of a hand, may, in non-ideal environments, lose sight of the hand or other object and/or end up tracking an object that is not the desired object, causing inaccurate and unreliable performance of the system.

SUMMARY

The method for computer vision based tracking of an object, according to embodiments of the invention, provides an efficient process for accurate tracking of an object, regardless of the background environment and of other complications such as quick movement of the object.

A method according to embodiments of the invention verifies that a desired object is accurately tracked.

In one embodiment a suspected object is detected in an image of a space. A bounding shape which is aligned towards the center of the image, is created around the suspected object in the image. The object is then tracked by tracking a feature selected from within the bounding shape. Based on the tracking of the object a determination of occupancy can be made.

BRIEF DESCRIPTION OF THE DRAWINGS

The invention will now be described in relation to certain examples and embodiments with reference to the following illustrative drawing figures so that it may be more fully understood. In the drawings.

DETAILED DESCRIPTION

Computer vision based identification and tracking of a hand or other objects during a process of user-machine interaction may need to deal with diverse image backgrounds (e.g., image portions behind or separate from the hand or other object) which may cause interruption of tracking of the hand or other object.

A method for computer vision based tracking of an object (such as a hand or human form) and control of a device, according to embodiments of the invention, verifies and updates the location and optionally other parameters of the object such as size and orientation of an object and updates the tracking based on the verified, updated location and/or additional parameters of the object.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention. For example, embodiments may be exemplified by describing the tracking of a hand shaped object however other shaped objects may be tracked using methods according to embodiments of the invention. Thus, embodiments which relate to tracking of a hand shaped object may be understood to apply to tracking of other shaped objects, such as human form shaped objects.

Unless specifically stated otherwise, as apparent from the following discussions, it is appreciated that throughout the specification discussions utilizing terms such as "processing," "computing," "calculating," "determining," "creating" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Methods according to embodiments of the invention may be implemented in a user-device interaction system which includes a device to be operated and controlled by user commands and an image sensor. Exemplary systems, according to embodiments of the invention, are described in FIGS. 5A and 5B, below. However, other systems may carry out embodiments of the present invention.

According to embodiments of the invention user commands or input are based on identification and tracking of the user's hand or based on identification and tracking of another shaped object, such as a human form shaped object. The system identifies the user's hand or human form shaped object in the images obtained by the image sensor. Once a user's hand or human form shaped object is identified it is tracked such that movement of the object may be followed and translated into operating, input and control commands. For example, the device may include a display and movement of a hand may be translated into movement on the display of an icon or symbol, such as a cursor or any other displayed object. Movement of the hand may be translated into another manipulation of content on the display. In another example, the device may be a home appliance such as a lighting or HVAC (heating, ventilating, and air conditioning) device or other environment comfort device. Movement of a human form (as determined by tracking the human form) may be translated to determination of occupancy in a monitored space and the device may be controlled according to the determination of occupancy. For example, a lighting device or HVAC device may be turned ON or OFF or output of the device may be modulated based on the determination of occupancy.

The image sensor may be a standard two dimensional (2D) camera and may be associated with a processor and a storage device for storing image data. The storage device may be integrated within the image sensor or may be external to the image sensor. According to some embodiments, image data may be stored in the processor, for example in a cache memory. In some embodiments image data of a field of view (which includes a user's hand or other object) is sent to the processor for analysis. A user command or input is generated by the processor, based on the image analysis, and is sent to a device, which may be any electronic device that can accept user commands, e.g., television (TV), DVD player, personal computer (PC), mobile phone, camera, STB (Set Top Box), streamer, home appliance as described above, etc. According to one embodiment the device is an electronic device available with an integrated standard 2D camera. According to other embodiments a camera is an external accessory to the device. According to some embodiments more than one 2D camera is provided to enable obtaining three dimensional (3D) information. According to some embodiments the system includes a 3D camera.

One or more detectors may be used for correct identification of a moving object and for identification of different postures of the object. For example, a contour detector may be used together with a feature detector.

Methods for tracking an object may include using an optical flow algorithm or other known tracking methods.

Figure 1A:
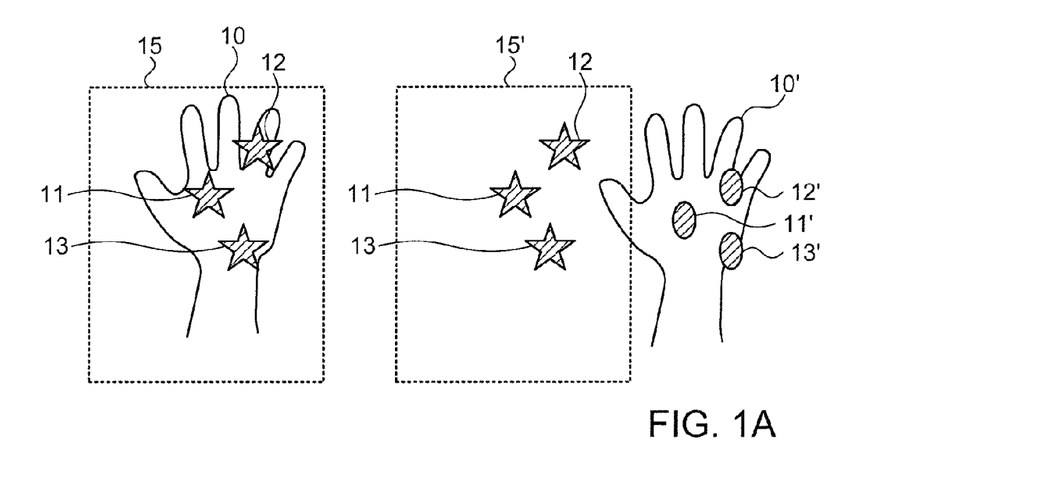
FIGS. 1A and 1B schematically illustrate a method for tracking a hand according to embodiments of the invention.

An embodiment of tracking or determining the changing location of a hand shaped object is schematically illustrated in FIG. 1A. An object 10 having a shape of a hand is identified in a first image and a set of features 11, 12 and 13 which are associated with the object 10, are detected. The features 11, 12 and 13, which may be, for example, specific pixels (e.g., based on color) or patterns, (typically patterns containing points such as perpendicular edges, dots, intersections or corners, or high-contrast patterns) or vectors, are then determined to be in bounding rectangle 15.

Detecting and selecting features may be done by using feature detection algorithms such as goodFeaturesToTrack™ or cornerHarris™ or other appropriate feature detection algorithms.

In a subsequent image frame, assuming movement in between the frames, the features 11, 12 and 13 will be located in a new location. In prior art tracking systems the features 11, 12 and 13 are searched for in the subsequent image, their new location is determined and their movement or transformation is calculated and a new bounding rectangle 15', which includes features 11, 12 and 13 is then created.

It should be appreciated that using a bounding shape, such as a rectangle, in tracking is one possible technique; however, this explanation relates also to the use of other bounding shapes or other techniques not using a bounding shape.

Bounding rectangle 15' is typically considered to represent the hand shaped object 10 in its new location or position. However, as schematically shown in FIG. 1A, the new location of features 11, 12 and 13 does not necessarily represent the actual new location of the hand shaped object 10'. Other objects in the background of the hand shaped object 10 (such as the user's own body, a moving object in the background, etc.) may include features similar or even identical to features 11, 12 and 13 and the system may thus mistakenly identify these features as being "hand shaped object features" in the subsequent image, whereas these features may no longer be related to the hand shaped object. Continuing to track or determine the changing location of features 11, 12 and 13 may thus cause inaccurate tracking of the hand shaped object and eventually the hand shaped object may be lost all together.

Figure 1B:
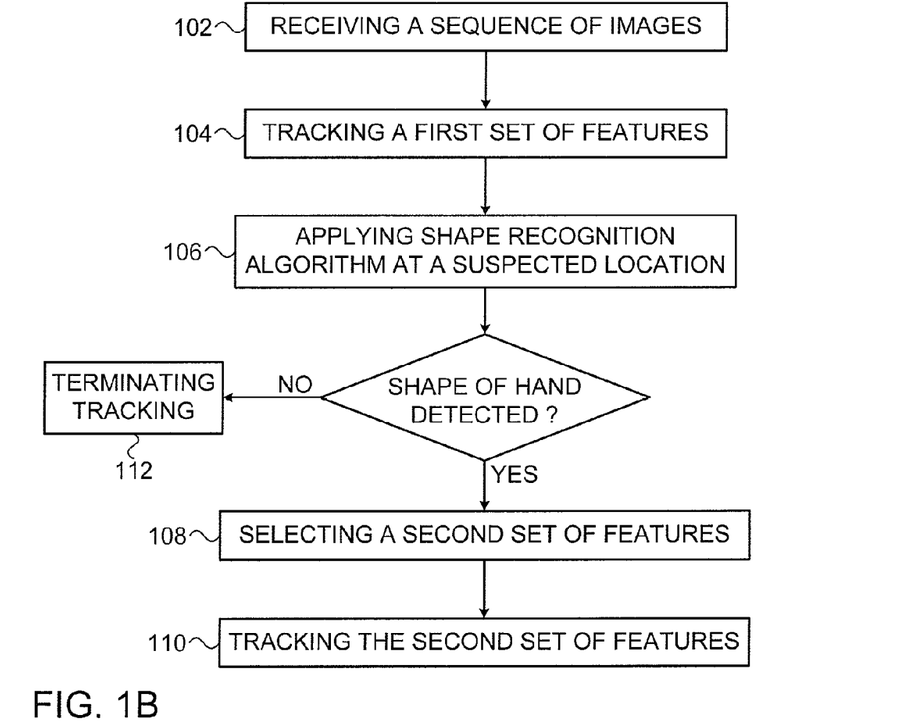

To avoid this situation, embodiments of the invention may verify that the object being tracked has a shape of a hand. A method for computer vision based tracking of a hand, according to an embodiment of the invention, is schematically illustrated in FIG. 1B. According to one embodiment the method includes receiving a sequence or series of images (e.g., a movie) of a field of view (102), the images including at least one object having a shape of a hand (the hand shape of the object may be determined by known methods for shape recognition), and tracking at least one first feature, typically a first set of selected features, from within the object (e.g., inside the borders of the object in the image of the object) throughout or across at least some of the images (104). Tracking may typically include determining or estimating the positions and other relevant information of moving objects in image sequences. At some point (e.g., every image or every few images, or periodically), a shape recognition algorithm is applied at or executed on a suspected or possible location of the object in a subsequent image to detect a shape of a hand in that subsequent image (106). Once a shape of a hand is detected at the suspected or possible location at least one second feature or second set of features is selected from within the detected shape of the hand (108) (e.g., inside the borders of the hand in the image of the hand) and the second set of features is now tracked (110).

Detecting a shape of a hand may be done for example by applying a shape recognition algorithm (for example, an algorithm which calculates Haar-like features in a Viola-Jones object detection framework), using machine learning techniques and other suitable shape detection methods, and optionally checking additional parameters, such as color parameters.

It should be appreciated that a "shape of a hand" may refer to a shape of a hand in different positions or postures, such as a hand with all fingers extended (open hand) or a hand with all fingers brought together such that their tips are touching or almost touching (as if the hand is holding a bulb) or other postures.

Thus, referring back to FIG. 1A, in a series or sequence of images features 11, 12 and 13 are selected from within object 10 in a first image of the sequence and may be tracked in one or more subsequent images but in a second (or another) subsequent image a hand shaped object 10' is searched for and once detected, a new set of features 11', 12' and 13' is selected from within the hand shaped object 10'. In subsequent images the features 11', 12' and 13' will be tracked, and not features 11, 12 and 13. This process may be repeated or iterated at specific intervals, once in every so many frames, or in any other predetermined cycle or pattern.

Typically, a hand shape is detected by applying a shape recognition algorithm at a suspected or possible location in the subsequent image. The suspected or possible location is a location having a probability which is above a certain threshold, of being the location of the user's hand, as is explained in detail further herein.

This process, of looking for a shape of a hand at a suspected or possible location and once detected, selecting a second, or other set of features from within the newly detected shape, and tracking the newly selected features, may be iterated or repeated, thus enabling accurate tracking of a hand shaped object throughout or across, or for, a plurality images.

Thus, if a shape of a hand is detected at the suspected location, the hand shape may be tracked (e.g., as described above) and a device may be controlled based, among other things, on the tracking of the hand. Referring to FIG. 1B, according to one embodiment, if no shape of a hand is detected at the suspected location, the tracking is ended or terminated (112) and the process may begin again. According to other embodiments other steps may be performed if no hand shape is detected, e.g. the system may continue tracking the first set of features and further search for a hand shape.

Figure 1C:
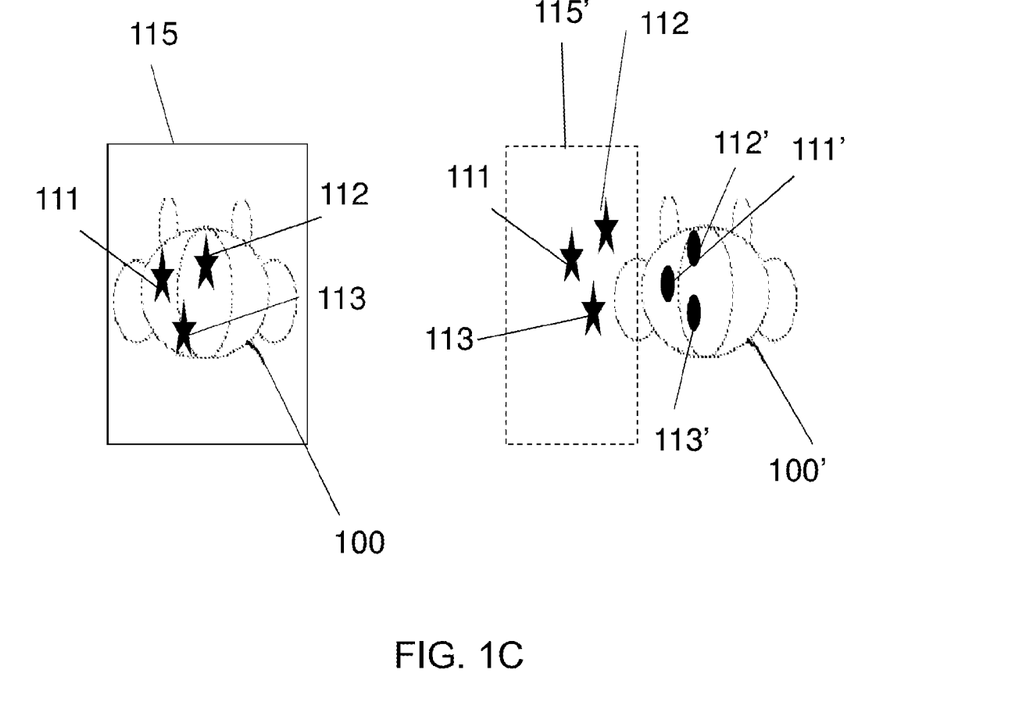
FIGS. 1C and 1D schematically illustrate a method for tracking a human according to embodiments of the invention.

An embodiment of tracking or determining the changing location of a human form shaped object is schematically illustrated in FIG. 1C. An object having a shape of a human form, for example, the shape of a human 100 in a top view image, is identified in a first image and a set of features 111, 112 and 113 which are associated with the shape of a human 100, are detected. The features 111, 112 and 113, which may be, for example, specific pixels (e.g., based on color) or patterns, (typically patterns containing points such as perpendicular edges, dots, intersections or corners, or high-contrast patterns) or vectors, may then be determined to be in bounding rectangle 115.

Detecting and selecting features may be done by using feature detection algorithms such as goodFeaturesTo-Track™ or cornerHarris™ or other appropriate feature detection algorithms.

In a subsequent image frame, assuming movement in between the frames, the features 111, 112 and 113 will be located in a new location. In prior art tracking systems the features 111, 112 and 113 are searched for in the subsequent image, their new location is determined and their movement or transformation is calculated and a new bounding rectangle 115', which includes features 111, 112 and 113 is then created.

It should be appreciated that using a bounding shape, such as a rectangle, in tracking is one possible technique; however, this explanation relates also to the use of other bounding shapes or other techniques not using a bounding shape.

Bounding rectangle 115' is typically considered to represent the shape of a human 100 in its new location or position. However, as schematically shown in FIG. 1C, the new location of features 111, 112 and 113 does not necessarily represent the actual new location of the shape of a human 100'. Other objects in the background of the space being monitored may include features similar or even identical to features 111, 112 and 113 and the system may thus mistakenly identify these features as being "human form shape features" in the subsequent image, whereas these features may no longer be related to the shape of a human being tracked. Continuing to track or determine the changing location of features 111, 112 and 113 may thus cause inaccurate tracking of the shape of a human and eventually the shape of a human may be lost all together.

Figure 1D:
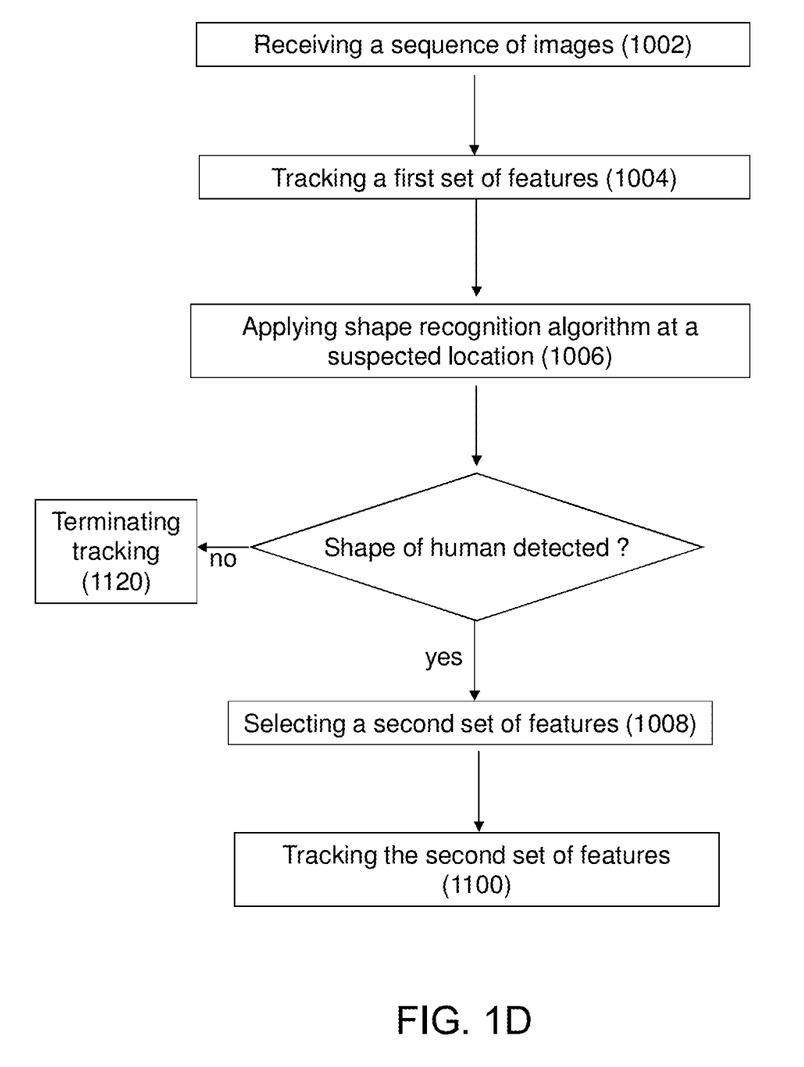

To avoid this situation, embodiments of the invention may verify that the object being tracked has a shape of a human, e.g., a shape of a human in a top view image. A method for computer vision based tracking of a human form shaped object, according to an embodiment of the invention, is schematically illustrated in FIG. 1D. According to one embodiment the method includes receiving a sequence or series of images (e.g., a movie) of a space (1002), the images including at least one object having a shape of a human (the human shape of the object may be determined by known methods for shape recognition), and tracking at least one first feature, typically a first set of selected features, from within the object (e.g., inside the borders of the shape of the object in the image) throughout or across at least some of the images (1004). Tracking may typically include determining or estimating the positions and other relevant information of moving objects in image sequences. At some point (e.g., every image or every few images, or periodically), a shape recognition algorithm is applied at or executed on a suspected or possible location of the object in a subsequent image to detect a shape of a human in that subsequent image (1006). Once a shape of a human is detected at the suspected or possible location at least one second feature or second set of features is selected from within the newly detected shape of the human (1008) (e.g., inside the borders of the human form in the image) and the second set of features is now tracked (1100).

Detecting a shape of a human may be done for example by applying a shape recognition algorithm (for example, an algorithm which calculates Haar-like features in a Viola-Jones object detection framework), using machine learning techniques and other suitable shape detection methods, and optionally checking additional parameters, such as color or motion parameters.

It should be appreciated that a "shape of a human" may refer to a shape of a human in different positions or postures and from different viewpoints, such as a human viewed from a ceiling mounted camera.

Detecting a shape of a human viewed from a ceiling mounted camera may be done by obtaining rotation invariant descriptors from the image. At any image location, a rotation invariant descriptor can be obtained, for example, by sampling image features (such as color, edginess, oriented edginess, histograms of the aforementioned primitive features, etc.) along one circle or several concentric circles and discarding the phase of the resulting descriptor using for instance the Fourier transform or similar transforms. In another embodiment descriptors may be obtained from a plurality of rotated images, referred to as image stacks, e.g., from images obtained by a rotating imager, or by applying software image rotations. Features stacks may be computed from the image stacks and serve as rotation invariant descriptors. In another embodiment, a histogram of features, higher order statistics of features, or other spatially-unaware descriptors provides rotation invariant data of the image. In another embodiment, an image or at least one features map may be filtered using at least one rotation invariant filter to obtain rotation invariant data.

Thus, referring back to FIG. 1C, in a series or sequence of images features 111, 112 and 113 are selected from within the shape of a human 100 in a first image of the sequence and may be tracked in one or more subsequent images but in a second (or another) subsequent image a shape of a human 100' is searched for and once detected, a new set of features 111', 112' and 113' is selected from within the newly detected shape of a human 100'. In subsequent images the features 111', 112' and 113' will be tracked, and not features 111, 112 and 113. This process may be repeated or iterated at specific intervals, once in every so many frames, or in any other predetermined cycle or pattern.

Typically, a human form shape is detected by applying a shape recognition algorithm (e.g., as described above) at a suspected or possible location in the subsequent image. The suspected or possible location is a location having a probability which is above a certain threshold, of being the location of the human form, as is explained in detail further herein.

This process, of looking for a shape of a human at a suspected or possible location and once detected, selecting a second, or other set of features from within the newly detected shape, and tracking the newly selected features, may be iterated or repeated, thus enabling accurate tracking of a human shaped object throughout or across, or for, a plurality images.

Thus, if a shape of a human is detected at the suspected location, the human shape may be tracked (e.g., as described above) and a device may be controlled based on the tracking of the human. Referring to FIG. 1D, according to one embodiment, if no shape of a human is detected at the suspected location, the tracking is ended or terminated (1120) and the process may begin again. According to other embodiments other steps may be performed if no human shape is detected, e.g. the system may continue tracking the first set of features and further search for a human shape.

Figure 1E:
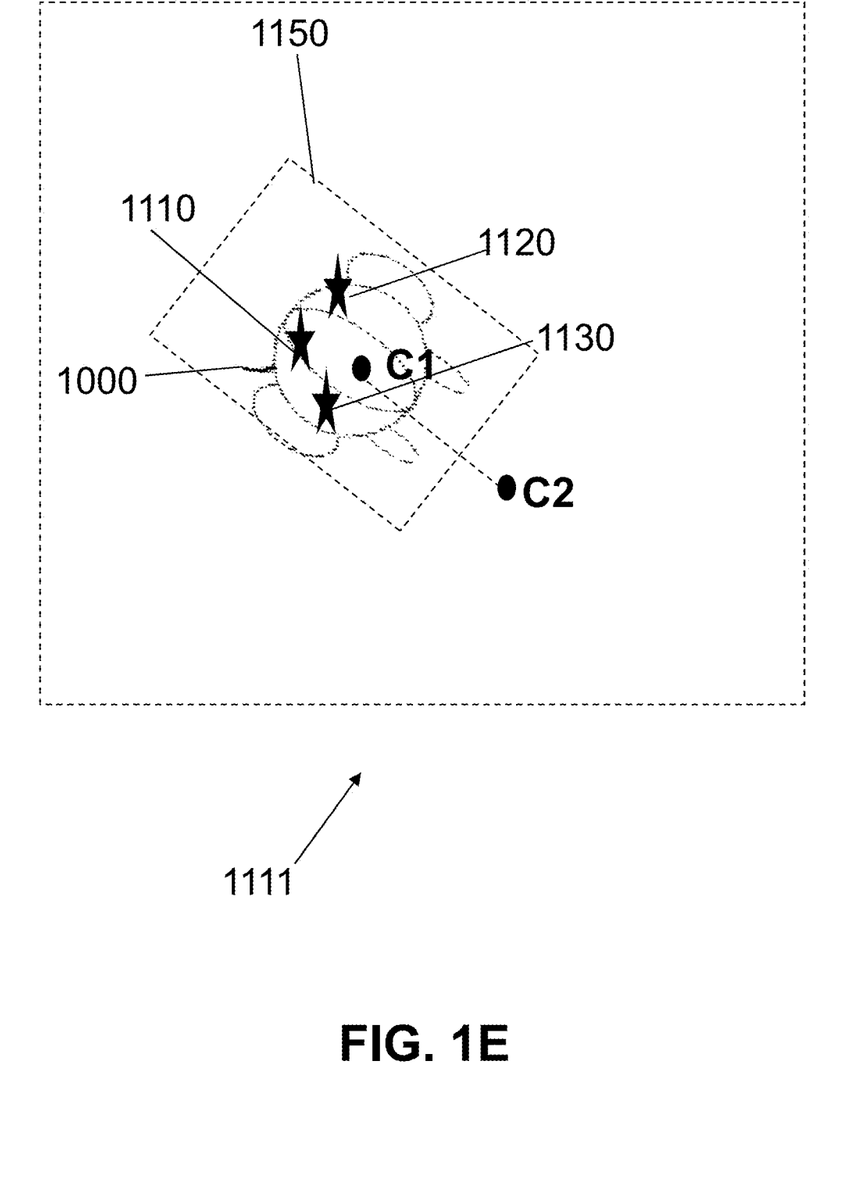
FIGS. 1E and 1F schematically illustrate a method for determining occupancy based on tracking a human, according to embodiments of the invention.

In one embodiment the bounding rectangle, or bounding shape, is aligned towards the center of the image, as schematically illustrated in FIG. 1E.

A suspected occupant 1000 is identified in a first image 1111 (typically a top view image). A set of features 1110, 1120 and 1130 which are associated with the suspected occupant 1000, some examples of which are described above, are detected and a bounding shape (e.g., rectangle or ellipse) 1150 is created around the suspected occupant including the features 1110, 1120 and 1130, such that the bounding shape 1150 is aligned towards the center of the image 1111. Features selected from within the bounding shape 1150 are then tracked (e.g., by the method described in FIG. 1C) to determine occupancy (e.g., to determine the presence of an occupant, to count occupants, to determine location of occupants, etc.).

A top view perspective causes standing or sitting people in an image (a top view image) to appear radially aligned such that their feet are closer to the center of the image than their heads. Using a bounding box (or other shape) which is also radially aligned ensures a better fit of the bounding shape to the object, providing a more efficient bounding shape (a high percentage of the pixels enclosed in the bounding shape belong to the object). Thus, using a bounding shape aligned towards the center of the image to track an occupant, as described herein, facilitates the accuracy of tracking.

In a subsequent, second, image, assuming movement in between the first image 1111 and second image, the features 1110, 1120 and 1130 will be located in a new location. However, the new location of features 1110, 1120 and 1130 does not necessarily represent the actual new location of the occupant, as described above.

To avoid inaccurate tracking, embodiments of the invention may verify that the object being tracked has a shape of an occupant, e.g., a shape of a human in a top view image.

Figure 1F:
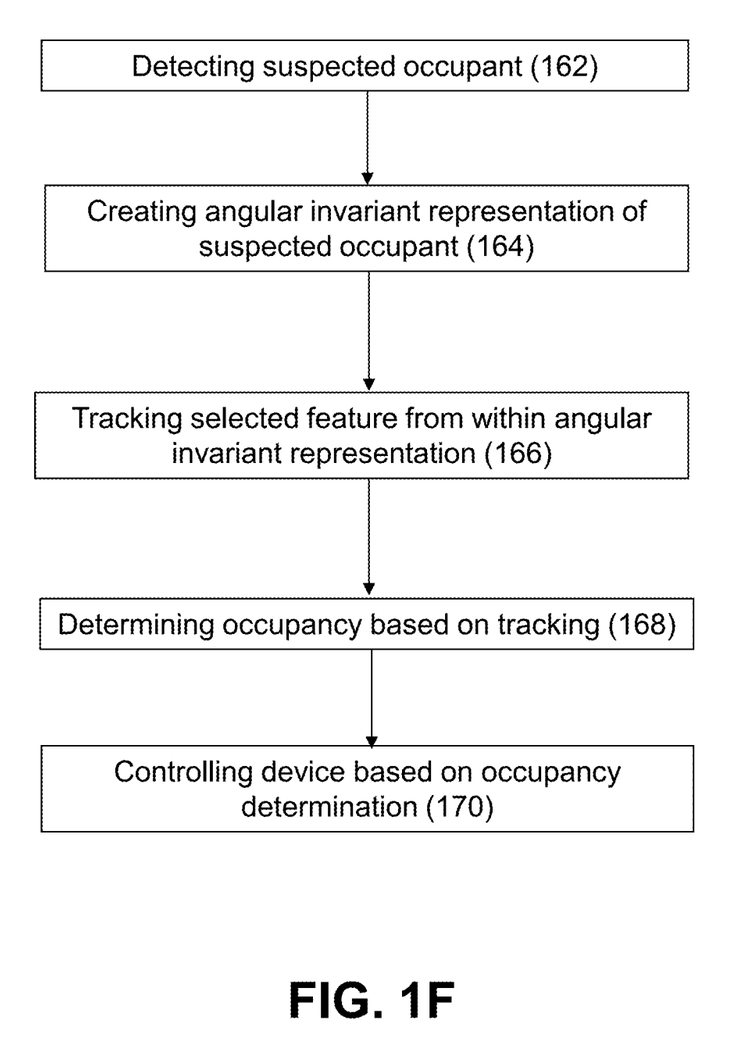

Detecting the shape of an occupant and tracking an occupant can be used to determine occupancy in an imaged space. In one embodiment which is schematically illustrated in FIG. 1F, the method includes detecting a suspected occupant in a first image of a space (162) and creating an angular invariant representation of the suspected occupant (164) (for example, a bounding shape enclosing the suspected occupant object, which is aligned towards the center of the image). A feature (e.g., as described above) selected from within the angular invariant representation (166) is tracked (e.g., as described above) and occupancy in the space is determined based on the tracking (168). In some embodiments a device, such as an environment comfort device, is controlled based on the determination of occupancy (170).

For example, tracking suspected occupants may be used to count or determine the number of occupants in a monitored space. Once the number of occupants in the space exceeds a predetermined threshold an HVAC device may be turned on or the parameters (e.g., set temperature) of the HVAC device may be modulated based on the number of occupants in the space.

In one embodiment detecting a suspected object may be done by detecting movement in images of the space. In one embodiment the movement is a predetermined movement, in one example, movement typical of a human, e.g., movement in a predetermined direction or movement in a predetermined velocity range. Movement may also be in a predetermined size range, typically by determining the amount of pixels displaced between subsequent images.

In one embodiment a bounding shape can be created such that it encompasses the pixels (or a percentage of the pixels) participating in the movement and such that it is aligned towards the center of the image.

Creating a bounding shape such that it is aligned towards the center of an image may be done, for example as shown in FIG. 1E, by a processor (e.g., processor 502 described in FIG. 5A or associated processing unit) determining the center of mass C1 of the object (e.g., the suspected occupant detected in a first image) and (virtually) drawing a line between the center of mass C1 of the object and the center of the image C2. A bounding shape 1150 (e.g., a rectangle, ellipse or other shape) is then drawn around the object such that the longitudinal axis of the bounding shape 1150 is parallel to the virtual line. Other methods of creating a radially aligned bounding shape can be used according to embodiments of the invention. Other angular invariant representations may be used according to embodiments of the invention.

In some embodiments a suspected object may be determined to be an occupant, for example by applying a shape recognition algorithm on the image of the space. An object defined by the bounding shape may be determined to be an occupant by its shape.

In one embodiment a shape recognition algorithm is applied at a suspected location of an occupant in a second (typically subsequent) image of the space to detect a new suspected object in the image. A bounding shape (aligned towards the center of the second image) is created around the new suspected object in the image and a newly selected feature is tracked from within the new bounding shape. Occupancy in the space may be determined based on the tracking of the newly selected feature.

In some embodiments an environment comfort device is controlled (e.g., ON/OFF or modulated as further described herein) based on the occupancy determination.

Thus, in one embodiment a human form may be tracked in a sequence of images by detecting in a first image an object having a shape of a human form; tracking at least one first selected feature from within the shape of the human form; detecting in a second image a shape of a human form by obtaining rotation invariant descriptors from the second image at a suspected location of the human form in the second image; selecting at least one feature from within the shape of the human form detected in the second image; and tracking the feature selected from within the shape of the human form in the second image.

Tracking a human form within a sequence of images, according to embodiments of the invention, may be used to determine occupancy in a space. The determination of occupancy may be used to control a device. For example, a lighting device or HVAC device may be turned ON or OFF or output of the device may be modulated based on the determination of occupancy.

Determining that no shape of an object (e.g., hand or human form) has been detected may usually be done based on several frames. Shape recognition algorithms may be applied to one or more image frames and a probability grade or rating may be assigned to or associated with the detected shape in each frame. E.g., each of a plurality of frames may have a probability grade assigned to it based on shapes within the images. The probability grades may be assigned based on considerations such as the likeness of the detected shape to a hand shape or human form, color parameters and other suitable parameters. According to one embodiment the determination that an object does not have a shape of a hand or human form is done if the probability grade is below a predetermined threshold. For example, an object may be determined not to have a shape of a hand or human form if the probability grade of a shape is below 50%. The final determination that no shape of a hand or human form has been detected may be based on a summation or other calculation of several probability grades. The probability grades may be used, e.g., by adding or averaging, to obtain a combined probability grade. For example, a shape algorithm can be applied to 10 images, the detected shape in each image (and thus each image) being assigned its own grade. The final probability grade may be an average of all 10 grades and the determination whether the shape is a hand shape or human form or other desired shape or not is based on all 10 frames.

To save computational power a shape of an object (e.g., hand or human form) is typically searched at a certain, limited area within an image frame rather than in the whole frame. This area is typically where the object is expected or suspected to be, e.g. a suspected location (where location can mean an area). In other words, a suspected location is a location having a probability which is above a certain threshold, of being the location of a desired object.

According to one embodiment the probability of a location being a suspected location may be based on parameters such as relative location within the image frame or on the direction of the object based on the tracking of the object throughout a sequence of images.

Typically, the probability of a location being a suspected location is based on the tracking of the object, for example, a suspected location may be in the direction of movement of the object as determined by the tracking of the object in previous frames.

Figure 2A:
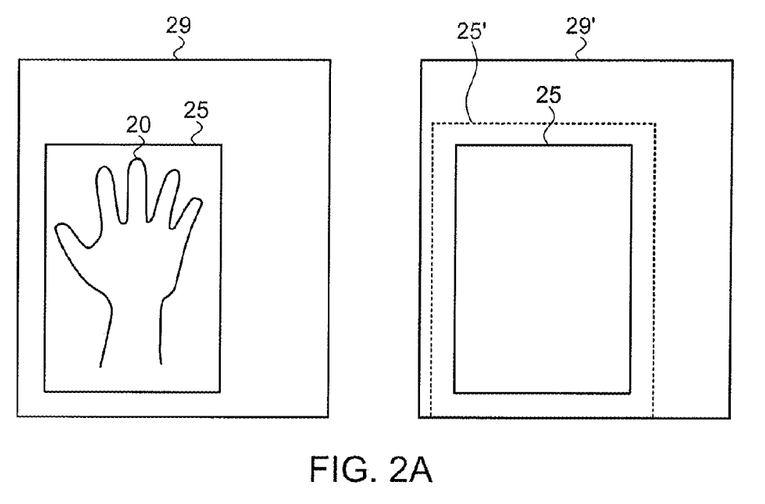
FIGS. 2A and 2B schematically illustrate the step of determining a suspected location for searching a hand shape based on the dimensions of the hand, according to embodiments of the invention.

In one embodiment the probability of a location being a location of the user's hand, is based on distance from the location of the hand in a previous frame. For example, as schematically illustrated in FIG. 2A, an object 20 having a shape of a hand is located at coordinates defined by bounding rectangle 25 within a first image frame 29. In a subsequent image frame 29', assuming that the object has moved in between frames, it is expected that the object 20 will not be very far from its location in frame 29. While gesturing, it is expected that a user should move his hand in between frames, but usually not drastically, since gesturing and control of displayed content, for example, usually require moderate movements. Thus, a suspected location in frame 29' may be in the vicinity of the location of bounding rectangle 25, namely, within the boundaries of new rectangle 25'. In one example, the threshold (the dimensions of the new rectangle 25') is a certain distance from the previous location of the hand in a previous image, a distance which is determined in units of "width of a hand", e.g., not more than 2 widths of the hand. Other parameters may be used to determine a threshold.

It should be appreciated that using a bounding shape, such as a rectangle, in tracking is one possible technique; however, other bounding shapes or other techniques not using a bounding shape may also be used.

Figure 2B:
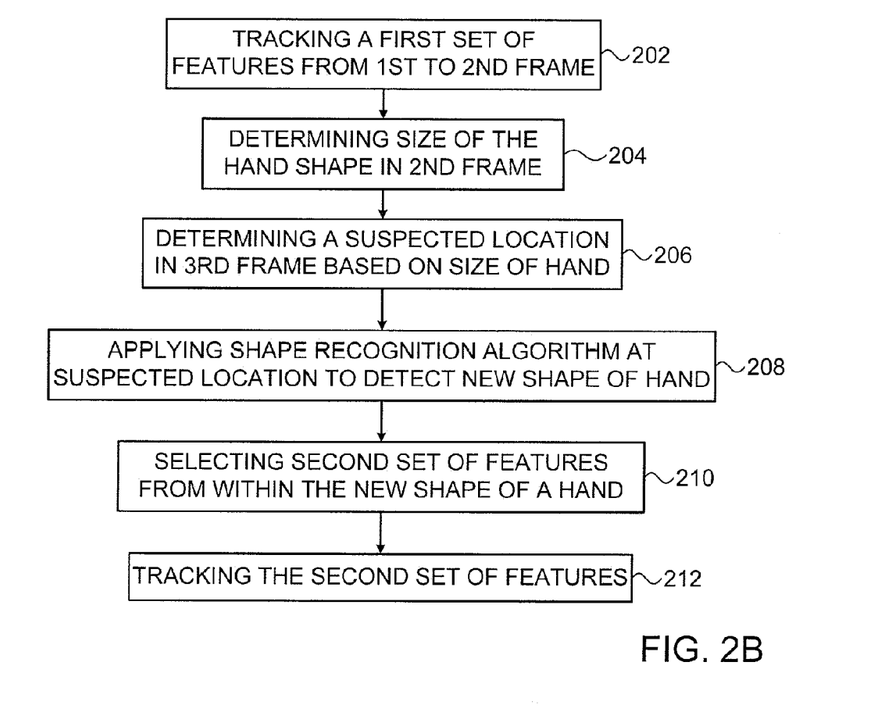

According to one embodiment, which is schematically illustrated in FIG. 2B, the method includes tracking a first set of features from a first image to a second image (202), determining, e.g., based on the transformation of the features between the first and second image, the size or dimension of the shape of the hand (204) in the second image, tracking the first set of features from the second image to a third, subsequent, image and determining the suspected location in the third image based the tracking of the first set of features and based on the size of the hand in the second image (206). A shape recognition algorithm is then applied at the suspected location in the third image (208) and once a shape of a hand is detected, a second set of features is selected from within the newly detected shape of the hand (210) and a second set of features is then tracked (212).

Once the size or dimension of the hand is known, units such as "width of a hand" may be calculated and used in determining a suspected location (as shown in FIG. 2A, where the suspected location is defined in units of "width of a hand") and/or when searching for a shape of a hand in a subsequent image.

Another parameter that can be used to facilitate searching and finding a shape of a hand is the posture, rotation, angle of the hand or a combination of these parameters. If a hand is found to be in a certain posture (e.g., at a certain angle relative to the camera) or having a certain shape (e.g., having a few fingers extended and a few fingers folded or other hand postures), this specific angle or posture may then be searched in a subsequent image.

Tracking the first set of features and/or the second set of features results in tracking a hand shaped object, which is in most cases, a user's hand. According to embodiments of the invention a device may be controlled according to the tracking of the user's hand. For example, an icon on a display of the device may be moved according to movement of the shape of the hand. According to one embodiment the icon is a cursor. Other icons, symbols or displayed content may be manipulated according to movement of the user's hand.

According to some embodiments the location of the user's hand may be periodically or continuously updated to keep accurate tracking of the user's hand, however, the location of the icon (e.g., cursor) on the display need not be updated and changed each time the location of the hand is updated since such updating may cause uneven movement of the icon on the display. Thus, embodiments of the invention may include a step of stopping movement of the icon (e.g., cursor) when tracking of the hand (or of the hand shaped object) is ended or terminated. Movement of the icon may then be resumed, possibly from the last location of the icon (when the movement of the icon was stopped), when tracking is resumed.

Examples of devices that may be controlled according to embodiments of the invention include TVs, DVD players, PCs, mobile telephones, cameras, STBs (Set Top Boxes), streamers, and other appliances.

Figure 3:
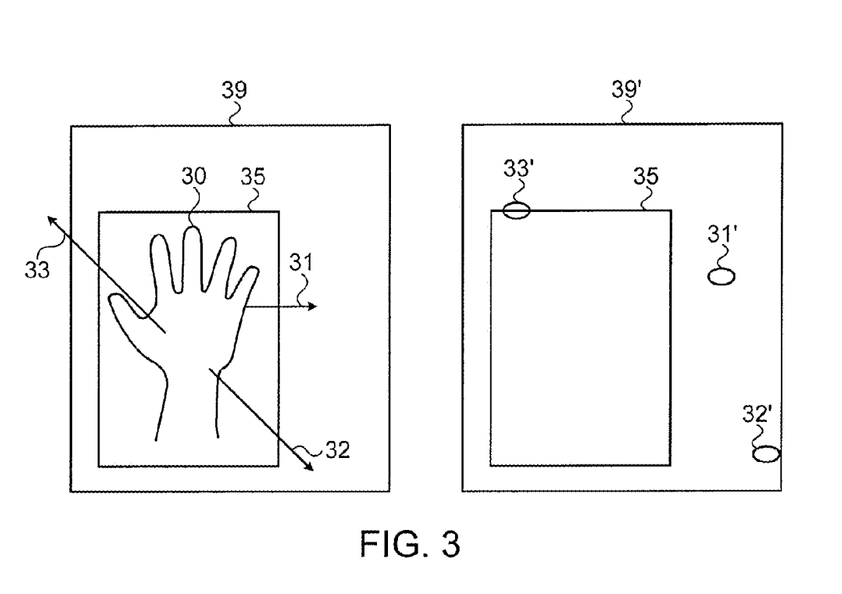
FIG. 3 schematically illustrates a method for tracking including selecting a suspected location based on grouped features, according to embodiments of the invention.

As discussed above, a direction of movement of a hand shaped object from previous frames can be used in determining a suspected location. For example, a suspected location can be determined as being in an area of the image which is in the direction of movement of the hand shaped object, based on the tracking of the object in previous images. Direction and other parameters (such as location within the image and/or size or posture of the hand, as discussed above) may be considered together when determining a suspected location. However, sometimes, an image frame may have several possible suspected locations and the actual location of the hand shaped object needs to be determined from these several possible locations. An example of such an embodiment is schematically illustrated in FIG. 3, in which the first set of features selected in frame 39 may include vectors (e.g., measurements having direction and magnitude) 31, 32 and 33. The features may be classified to groups (e.g., based on their direction or speed such that all vectors of the same direction and/or speed are grouped together) and multiple suspected locations are determined according to the locations of the groups. A shape recognition algorithm may be applied at each suspected location and the shape having the highest probability of being a hand shape or a human form shape or other desired object is found. The shape with the highest probability of being a shape of a hand (or human form) is then used for selecting a second set of features to be tracked.

The probability of a shape being a hand shape or human form shape may be determined by comparing to a model hand or model human form or by comparing to a "hand" and "non hand" (e.g., background) database (e.g., a shape most resembling a hand shape and/or being most different than a "non-hand") or by applying other suitable shape recognition algorithms.

Thus, for example, all the vectors having the same direction and/or speed as vector 31 or 32 or 33 are tracked in separate groups and their new locations 31', 32' and 33' in frame 39' may be possible suspected locations. Shape parameters (such as specific contours or machine learning parameters) and optionally additional parameters (such as size, angle or posture of the hand or human form) may be searched at each new location 31', 32' and 33' and the locations may be graded according to the shapes detected at each location. The shape having the highest grade may be selected and new features for further tracking are selected from this shape.

According to some embodiments a display of a device may be controlled according to the detection of the shape of the hand. For example, the display may change (e.g., an icon may appear or the display may change color or brightness or transparency) when a shape of a hand is not detected, to warn the user that tracking may be terminated and/or to motivate the user to more clearly present his hand to the camera of the system.

Figure 4A:
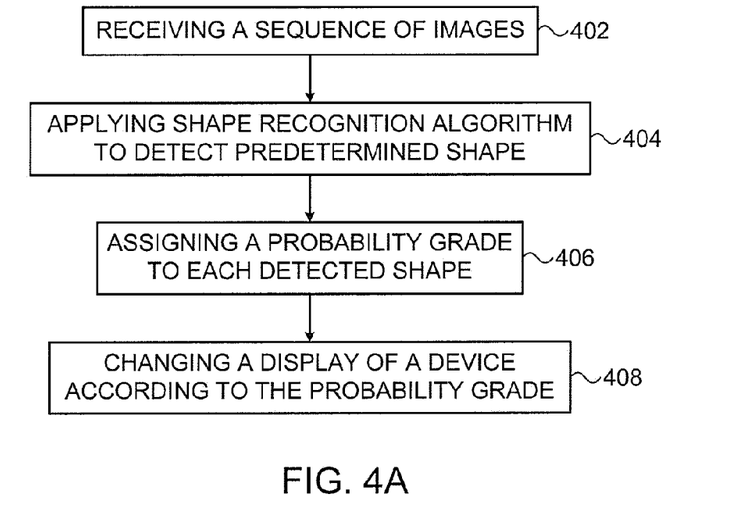
FIGS. 4A and 4B schematically illustrate a method for user-device interaction, according to an embodiment of the invention.

According to one embodiment schematically illustrated in FIG. 4A a method for computer vision based user-device interaction includes receiving a series or sequence of images of a field of view, the images including at least one user and one object (402) and applying a shape recognition algorithm to an image from the sequence of images to detect a predetermined shape of the object (404). A probability grade or rating is then assigned to or associated with each shape detected (406), or to each image. The probability grade may be based on a probability that the detected shape is the predetermined shape, e.g., on how similar the detected shape is to the predetermined shape. The probability grades may be used, e.g., by combining, adding or averaging, to obtain a combined probability grade. A display of a device is then changed according to the probability grade (408).

The object is an object that is controlled by the user, for example, the object may be a stick or ball held by the user and may be controlled by the user's hand. According to one embodiment the object is a user's body part, for example, the user's hand. According to this embodiment, the predetermined shape is a shape of a hand. A "shape of a hand" may refer to a shape of a hand in a specific posture, for example, a posture in which all fingers of the hand are extended or a hand with all fingers brought together such that their tips are touching or almost touching.

Figure 4B:
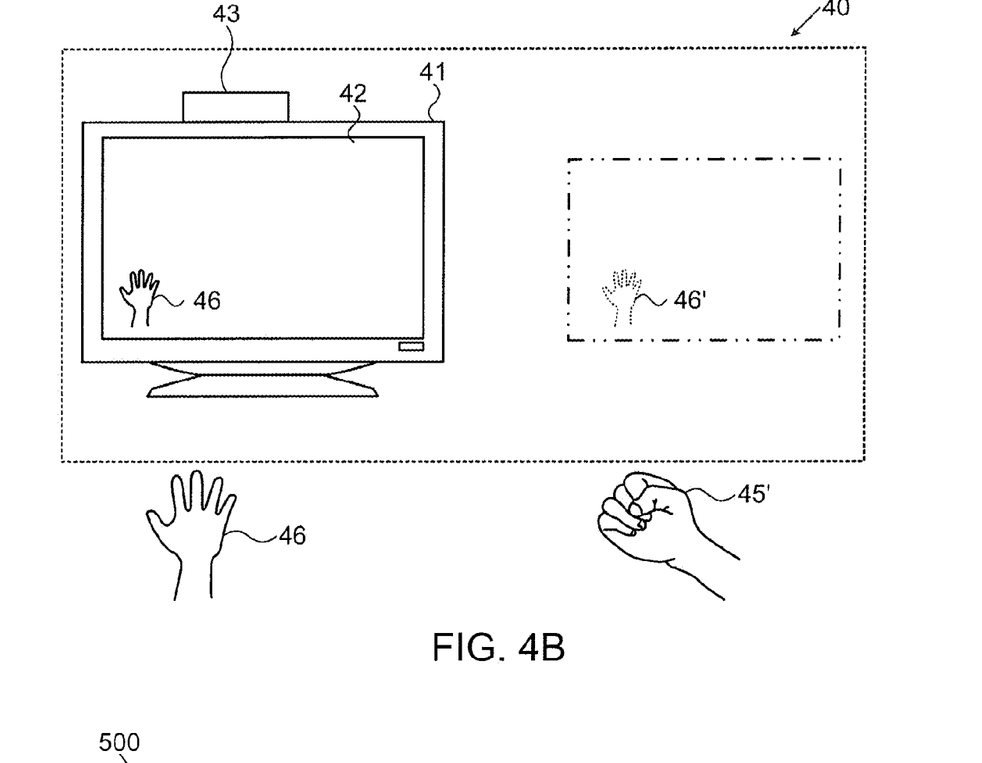

Thus, for example, as schematically illustrated in FIG. 4B, a user may control a device with hand 45 postures or gestures. A system 40 which includes the device 41, a display 42 and a camera 43, tracks the user's hand and detects hand postures and/or gestures to control the device 41. Once the user's hand 45 becomes less detectable by the system 40 (e.g., because the user is not holding his hand in a "correct" angle or position in relation to the camera (e.g., see hand 45') or due to changes in ambient light or due to other environment or user related reasons) the display 42 is changed so as to alert the user to the possibility of his hand being lost by the system 40.

For example, the display, parts of the display or specific icons on the display may change color or transparency. Other visible changes may occur.

According to one embodiment the icon on the display is an icon of a cursor. According to another embodiment the icon 46 represents a hand (e.g., an icon having the appearance of a hand). In a case where is hand 45 is clearly visible and the system can determine that the shape of the hand 45 detected by the system 40 is similar to a predetermined shape of a hand, the icon 46 on the display 42 will be opaque. If the user's hand 45' is held in a different posture (for example), the shape of the hand 45' which is detected by the system 40 will not be similar to the predetermined shape of a hand and therefore the icon 46' will become transparent.

According to some embodiments the change may be gradual, for example, the icon 46 may be completely opaque if the probability grade is 90% or more and may be partially transparent if the probability grade is around 50% and may become almost completely transparent if the probability grade is 20% or less. In another example, the icon 46 may have one color for a high probability grade and a different color for a low probability grade.

According to one embodiment assigning a probability grade to the detected shape is based on a probability that the detected shape is the predetermined shape and on another parameter, such as color or motion. For example, an object, such as an object held by the user or such as the user's hand, arm leg, head or other body part, may be determined to be only partly similar to a predetermined shape, thus being assigned a low probability grade. But, if, for example, the object is moving, or if the object is moving in a predetermined pattern (such as in a waving gesture), then the probability grade assigned to the shape may be higher.

Embodiments of the invention may use known methods for tracking selected features, such as optical flow techniques.

Detecting a shape of a hand may be done using known methods, for example by using machine learning techniques in which a shape of an object is compared to a learnt database of hands and to a database of "non-hand" (e.g., "non hand" may include background features, hands in postures other than a desired posture and other objects that are different than the desired hand shape).

In all the embodiments described above a "shape of a hand" may refer to a shape of a hand in any specific posture, such as a hand with all fingers extended or a hand with all fingers brought together such that their tips are touching or almost touching.

Figure 5A:
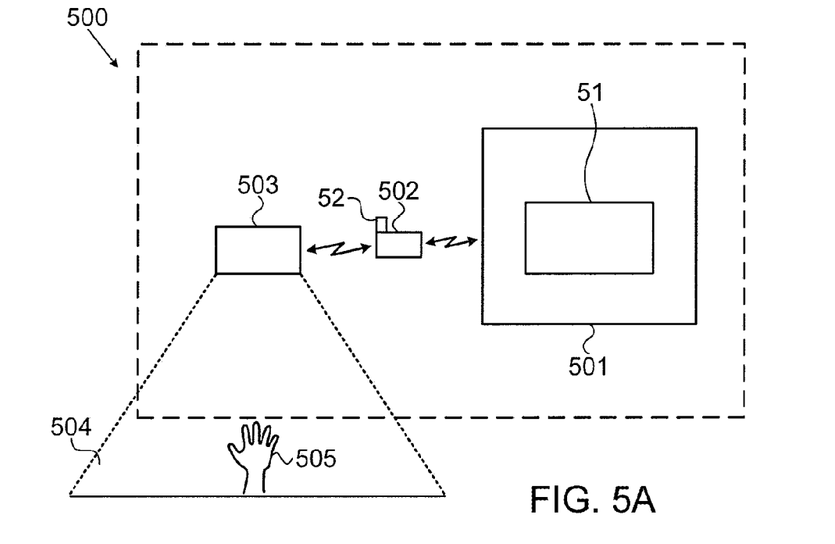
FIGS. 5A and 5B schematically illustrate systems operable according to embodiments of the invention.

A system operable according to one embodiment of the invention is schematically illustrated in FIG. 5A. The system 500 may include an image sensor 503, typically associated with a processor 502, memory 52, and a device 503. The image sensor 503 sends the processor 502 image data of field of view (FOV) 504 to be analyzed by processor 502. According to one embodiment a user command is generated by processor 502, based on the image analysis, and is sent to the device 501. According to some embodiments the image processing is performed by a first processor which then sends a signal to a second processor in which a user command is generated based on the signal from the first processor.

Processor 502 may include, for example, one or more processors and may be a central processing unit (CPU), a digital signal processor (DSP), a microprocessor, a controller, a chip, a microchip, an integrated circuit (IC), or any other suitable multi-purpose or specific processor or controller. Memory unit(s) 52 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

The device 501 may be any electronic device that can accept user commands, e.g., TV, DVD player, PC, mobile phone, camera, etc. According to one embodiment, device 501 is an electronic device available with an integrated standard 2D camera. The device 501 may include a display 51 or a display 51 may be independent, not connected to the device 501.

The processor 502 may be integral to the image sensor 503 or may be a separate unit. Alternatively, the processor 502 may be integrated within the device 501. According to other embodiments a first processor may be integrated within the image sensor and a second processor may be integrated within the device.

The communication between the image sensor 503 and processor 502 and/or between the processor 502 and the device 501 may be through a wired or wireless link, such as through infrared (IR) communication, radio transmission, Bluetooth technology and other suitable communication routes.

According to one embodiment the image sensor 503 is a camera such as a forward facing camera. The image sensor 503 may be a standard 2D camera such as a webcam or other standard video capture device, typically installed on PCs or other electronic devices.

The image sensor 503 may obtain frames at varying frame rates. According to embodiments of the invention the image sensor 503 obtains image data of a user's hand 505 when the hand enters the field of view 504.

According to some embodiments image data may be stored in processor 502, for example in a cache memory. Processor 502 can apply image analysis algorithms, such as motion detection and shape recognition algorithms to identify and further track the user's hand. Processor 502 may perform methods according to embodiments discussed herein by for example executing software or instructions stored in memory 52. When discussed herein, a processor such as processor 502 which may carry out all or part of a method as discussed herein, may be configured to carry out the method by, for example, being associated with or connected to a memory such as memory 52 storing code or software which, when executed by the processor, carry out the method.

Optionally, the system 500 may include an electronic display 51. According to embodiments of the invention, mouse emulation and/or control of a cursor on a display, are based on computer visual identification and tracking of a user's hand, for example, as detailed above.

For example, the system 500 may include a device 501, an imager, such as image sensor 503, to receive a sequence of images of a field of view and a processor, such as processor 502, which is in communication with the image sensor 503 and with the device 501. The processor 502 (or several processors) may detect within an image from the sequence of images an object having a shape of a hand; track at least one first selected feature from within the object; detect a shape of a hand at a suspected location of the object; select at least one second feature to be tracked from within the detected shape of the hand; track the second feature; and control the device 501 based on the tracking of the second feature.

Figure 5B:
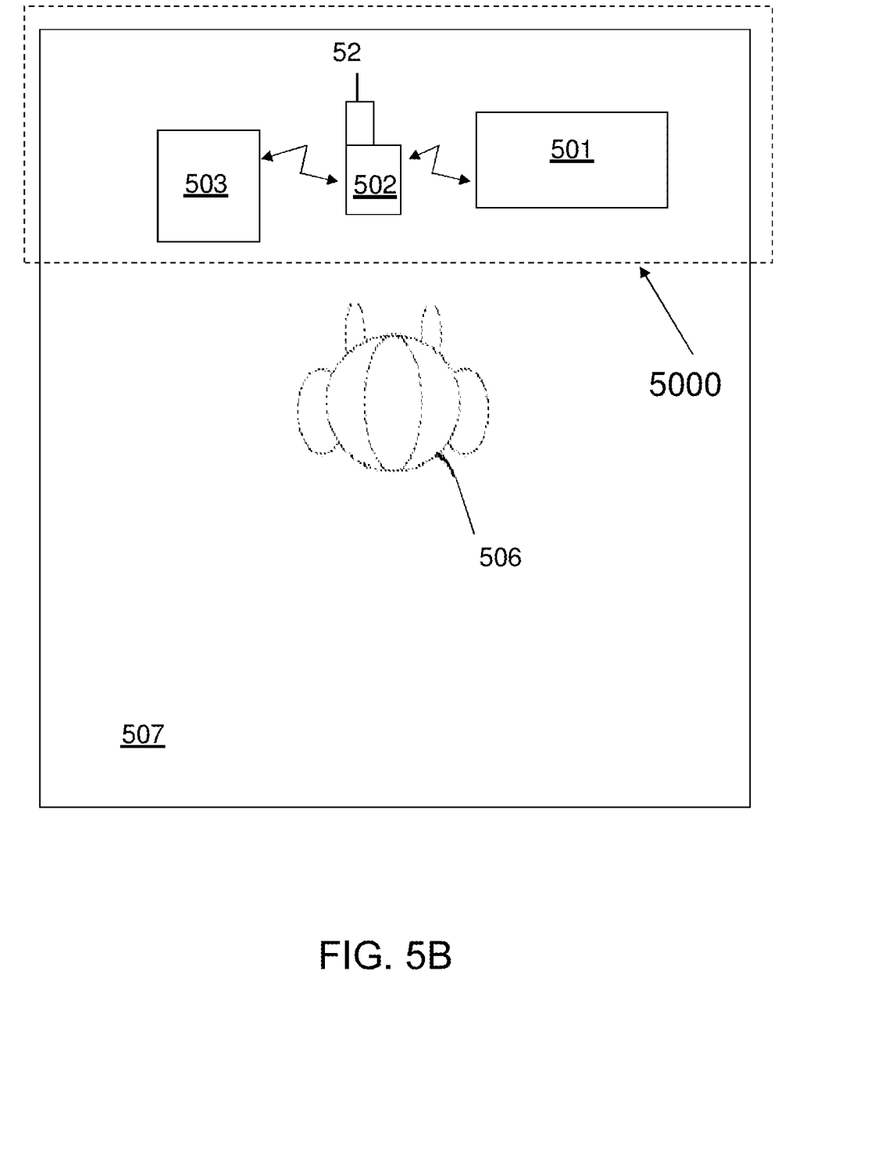

A system operable according to another embodiment of the invention is schematically illustrated in FIG. 5B. The system 5000 may include an image sensor 503, typically associated with a processor 502, memory 52, and a device 501, as described in FIG. 5A. The image sensor 503 sends the processor 502 image data of a monitored space 507 to be analyzed by processor 502. According to one embodiment the image sensor 503 is a ceiling mounted camera configured to obtain a top view of the space 507 and of an occupant 506 in the space.

A signal may be generated by processor 502, based on the image analysis, and may be sent to the device 501 to control the device 501. According to some embodiments the image processing is performed by a first processor which then sends a signal to a second processor in which another signal is generated based on the signal from the first processor.

The device 501 may be a home appliance such as a lighting or HVAC device. According to one embodiment, device 501 is an electronic device available with an integrated standard 2D or 3D camera.

The processor 502 may be integral to the image sensor 503 or may be a separate unit. Alternatively, the processor 502 may be integrated within the device 501. According to other embodiments a first processor may be integrated within the image sensor and a second processor may be integrated within the device.

The communication between the image sensor 503 and processor 502 and/or between the processor 502 and the device 501 may be through a wired or wireless link, such as through infrared (IR) communication, radio transmission, Bluetooth technology and other suitable communication routes.

According to some embodiments image data may be stored in processor 502, for example in a cache memory. Processor 502 can apply image analysis algorithms, such as motion detection and shape recognition algorithms to identify and further track the occupant 506. Processor 502 may perform methods according to embodiments discussed herein by for example executing software or instructions stored in memory 52. When discussed herein, a processor such as processor 502 which may carry out all or part of a method as discussed herein, may be configured to carry out the method by, for example, being associated with or connected to a memory such as memory 52 storing code or software which, when executed by the processor, carry out the method.

For example, the system 5000 may include a device 501, an imager, such as image sensor 503, to receive a sequence of images of a space 507 and a processor, such as processor 502, which is in communication with the image sensor 503 and with the device 501. The processor 502 (or several processors) may detect within an image from the sequence of images an object having a shape of a human; track at least one first selected feature or set of features from within the object; detect a shape of a human at a suspected location of the object; select at least one second feature or set of features to be tracked from within the newly detected shape of the human; track the second feature or set of features; and control the device 501 based on the tracking of the second feature or set of features.

In one embodiment occupancy in a space is determined based on the tracking (e.g., by processor 502). The processor 502 may generate a signal to control device 501 based on the determination of occupancy.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for determining occupancy in a space, the method comprising:
    detecting a suspected object in a first image of a space;
    creating a bounding shape around the suspected object in the image, the bounding shape being aligned towards the center of the image;
    tracking a selected feature from within the bounding shape;
    determining occupancy in the space based on the tracking; and
    controlling a device based on the occupancy determination.

2. The method of claim 1 comprising detecting a suspected object by detecting movement in images of the space.

3. The method of claim 2 wherein the movement is a predetermined movement.

4. The method of claim 1 wherein the bounding shape comprises a rectangle.

5. The method of claim 1 comprising determining that the suspected object comprises an occupant.

6. The method of claim 5 comprising applying a shape recognition algorithm on the image of the space to determine that the suspected object comprises an occupant.

7. The method of claim 5 comprising:
    applying a shape recognition algorithm at a suspected location of the occupant in a second image of the space to detect a new suspected object in the image;
    creating a new bounding shape around the new suspected object in the image, the bounding shape being aligned towards the center of the second image;
    tracking a newly selected feature from within the new bounding shape; and
    determining occupancy in the space based on the tracking of the newly selected feature.

8. The method of claim 1 comprising controlling an environment comfort device based on the occupancy determination.

* * * * *